(12) United States Patent
Andrieu et al.

(10) Patent No.: US 7,764,598 B2
(45) Date of Patent: Jul. 27, 2010

(54) DISTRIBUTION COMPARTMENTS FOR AN EFFICIENT AND FAILSAFE TRAFFIC DISTRIBUTION IN A PACKET-SWITCHED NETWORK

(75) Inventors: Jeremie Andrieu, Munich (FR); Andreas Kirstädter, Ebersberg (DE); Gonéri Le Cozannet, Paris (FR)

(73) Assignee: Siemens Aktiengesellschaft, Munich (DE)

( * ) Notice: Subject to any disclaimer, the term of this patent is extended or adjusted under 35 U.S.C. 154(b) by 553 days.

(21) Appl. No.: 10/525,155

(22) PCT Filed: Aug. 19, 2003

(86) PCT No.: PCT/EP03/09190

§ 371 (c)(1),
(2), (4) Date: Sep. 22, 2005

(87) PCT Pub. No.: WO2004/019564

PCT Pub. Date: Mar. 4, 2004

(65) Prior Publication Data

US 2006/0056295 A1    Mar. 16, 2006

(30) Foreign Application Priority Data

Aug. 21, 2002  (DE) ................................. 102 38 290

(51) Int. Cl.
*H04L 12/26* (2006.01)

(52) U.S. Cl. ........................ 370/217; 370/242; 370/255

(58) Field of Classification Search .................. 370/216, 370/217, 255, 229, 238, 254, 400
See application file for complete search history.

(56) References Cited

U.S. PATENT DOCUMENTS

| 5,491,690 | A | * | 2/1996 | Alfonsi et al. | ............... 370/404 |
| 5,881,243 | A | * | 3/1999 | Zaumen et al. | ............... 709/241 |
| 6,667,957 | B1 | * | 12/2003 | Corson et al. | ............... 370/238 |

FOREIGN PATENT DOCUMENTS

| EP | 1 035 751 A2 | 9/2000 |
| WO | WO 01/54448 A1 | 7/2001 |
| WO | WO 02/15521 A1 | 2/2002 |

OTHER PUBLICATIONS

Lin Y-D et al., "QOS Routing Granularity in MPLS Networks", IEEE Communications Magazine, IEEE Service Center, Pisscataway, NJ, US, vol. 40, No. 6, Jun. 2002, pp. 58-65, XP001123512.

* cited by examiner

*Primary Examiner*—Seema S Rao
*Assistant Examiner*—Henry Baron

(57) ABSTRACT

The invention relates to a method for establishing a distribution compartment in a packet-switched network. A classification of the network nodes is carried out according to output nodes of the network during which the class of a node is determined according to the minimum number of hops between the network nodes and the output nodes. Based on the classification, distribution compartments for flows can be established as to provide a freedom from loops and to enable a flexible reaction to malfunctions.

8 Claims, 8 Drawing Sheets

Links within classes

------▶ Link within class 1
--- ▶ Link within class 2

(x,y) classification of nodes within class 1 at the beginning:
x number of outgoing links
y "delta"

☐ Egress

○ Nodes one hop far from egress

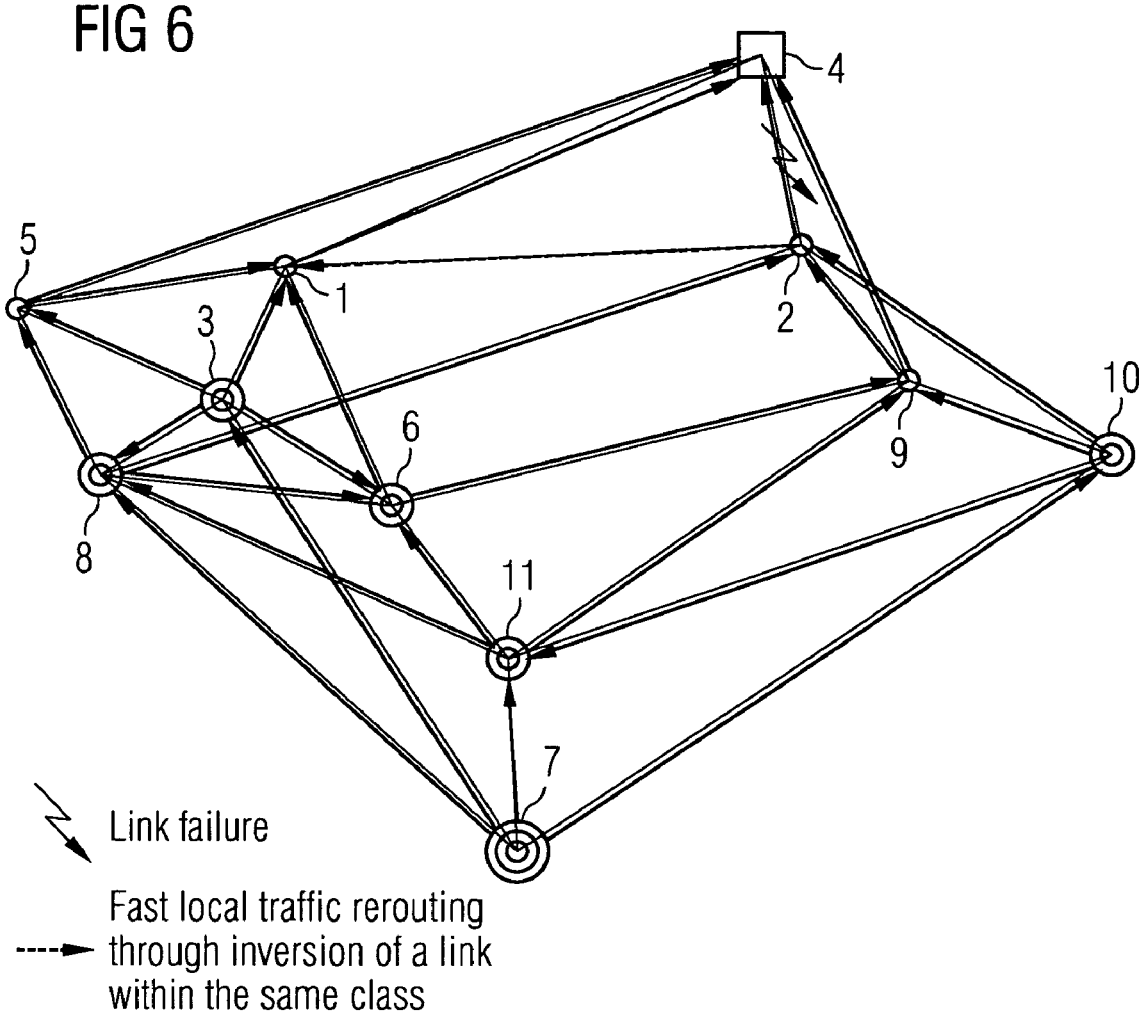

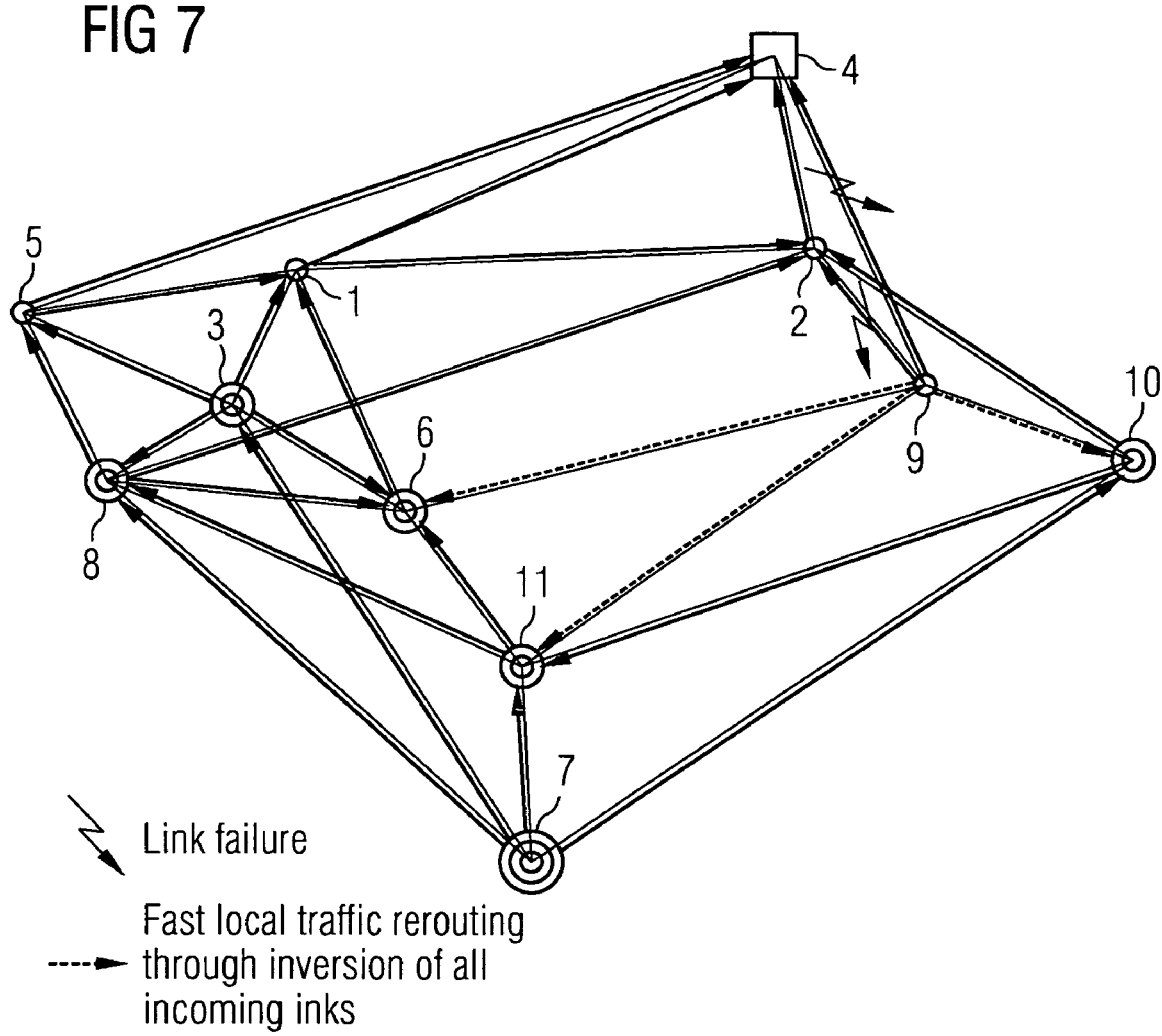

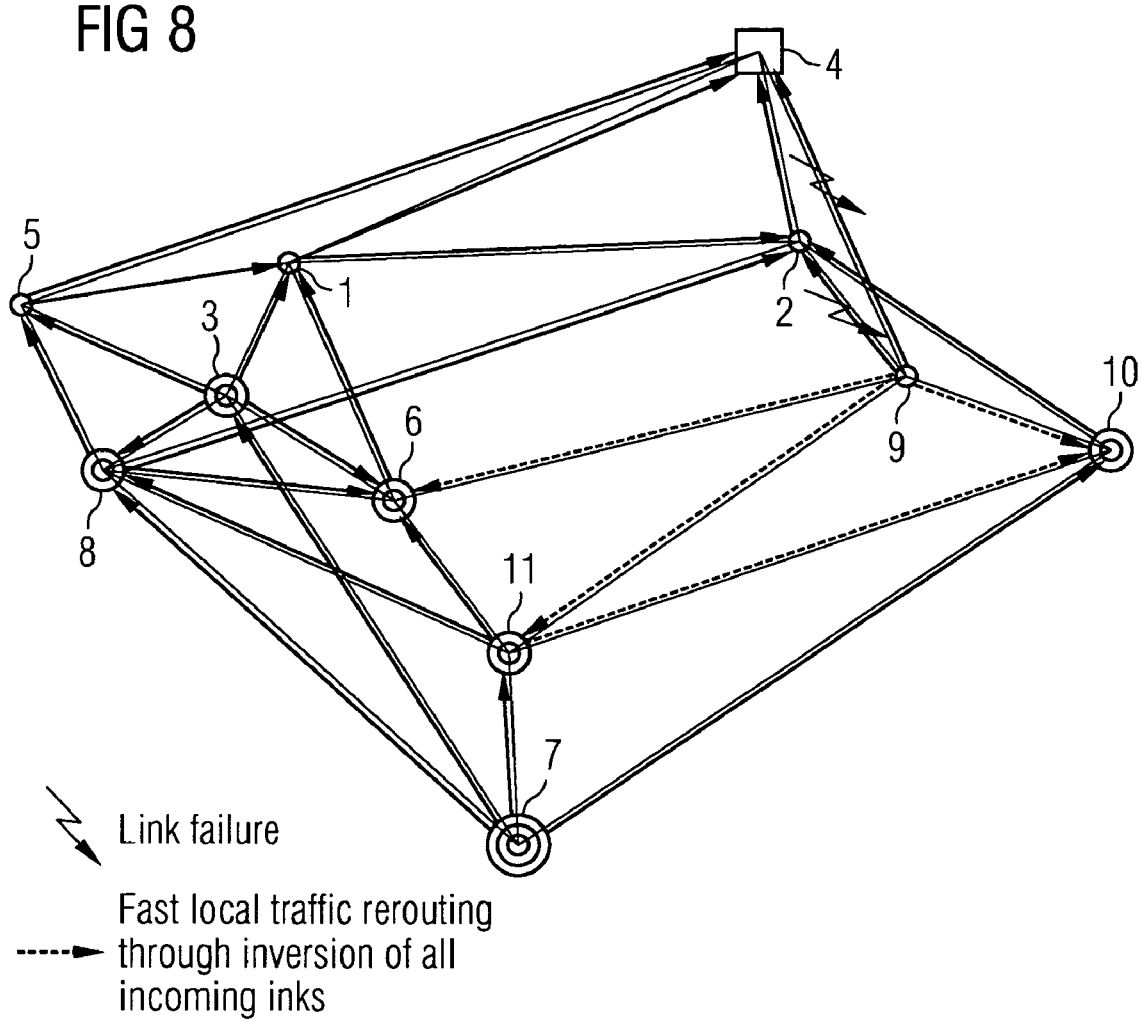

DISTRIBUTION COMPARTMENTS FOR AN EFFICIENT AND FAILSAFE TRAFFIC DISTRIBUTION IN A PACKET-SWITCHED NETWORK

CROSS REFERENCE TO RELATED APPLICATIONS

This application is the US National Stage of International Application No. PCT/EP2003/009190, filed Aug. 19, 2003 and claims the benefit thereof. The International Application claims the benefits of German application No. 10238290.5 filed Aug. 21, 2002, both applications are incorporated by reference herein in their entirety.

FIELD OF THE INVENTION

The invention relates to a method for defining a distribution fan-out in a packet network for packet traffic having the same egress node for the purposes of an efficient, failsafe traffic distribution.

BACKGROUND OF THE INVENTION

A central objective of the refinement of packet networks is currently to be able to offer real-time services via packet networks. The development tasks include switching, networking and Internet technology aspects.

Packet networks are conventionally used primarily for transmitting non-time-critical data such as file transfer or electronic mail. The aim of more recent developments is also to transmit services with real-time requirements such as telephony, which is conventionally handled via circuit-switched networks, and video information.

This intended expansion of the service spectrum involves corresponding requirements on transmission quality. For services with real-time transmission, specific quality parameters such as limits for data packet delay and loss must be complied with. In this context, the technical literature frequently refers to Quality of Service, abbreviated to QoS, parameters or requirements.

The most widely used packet network technology, which is based on IP (Internet Protocol), conventionally provides only best effort routing for the transmission of packets. Packets are transmitted from point to point or from router to router, the relevant router only deciding locally about the onward transmission of the packets to the next router. Internet terminology refers to individual hops. Within the framework of said best effort method, no quality of service parameters can be guaranteed. No corresponding monitoring of the delay times or packet loss rates is provided. These two parameters may assume considerable values, e.g. when bottlenecks occur in the case of individual routers or on individual links.

One approach to ensuring the monitoring necessary for quality of service level transmission in packet networks is to reserve paths from end to end or from host to host. Methods employing path reservation include ATM (Asynchronous Transfer Mode) or for the IP networks MPLS (Multi Protocol Label Switching). Reserving complete paths has the disadvantage of high complexity, low flexibility and poor resource utilization. Other methods have therefore been developed for the IP network, which at least in part preserve the flexibility of the original IP concept using best effort. One such approach is the Diff Serve (Differentiated Services) concept whereby packets are prioritized on entry to a subnetwork and are handled within said subnetwork according to their prioritization. Ultimately, however, this approach does not lead to genuine quality of service guarantees but only to the introduction of class-of-service categories.

SUMMARY OF THE INVENTION

The object of the invention is to allow data transmission with quality of service guarantees over a packet network while avoiding the disadvantages of conventional methods.

This object is achieved by the claims.

The starting point for the method according to the invention is the following concept for networks with quality of service data transmission. Efficient data packet transmission which respects delay and loss rate limits necessary for quality of service transmission can be achieved by strict monitoring of the traffic volume in a network combined with a flexible distribution of the traffic within said network. Central to the following description is the efficient distribution of data packets within a packet network for which the entire traffic volume can be limited by validity checks at the network edges.

Let there be a packet network with nodes (e.g. formed by routers). Further, let the nodes be networked using physical connections—hereinafter referred to as connection sections. According to the invention it will be set forth how packet traffic can be distributed within the network in such a way that bottlenecks or impairments due to the failure of transmission sections can be largely eliminated.

For describing the invention a number of terms will now be introduced or defined. As part of the concept for guaranteeing quality criteria for the transmission of data packets over a packet network using validity checks and traffic distribution, data packets having the same ingress and egress node are combined. The totality of such packets will hereinafter be referred to as a flow, i.e. a flow is constituted by the data packets which are transmitted between the same ingress and egress point of the network via any paths within the network. This definition differs from the normal definition of flow in which transmission from end point to end point, i.e. from host to host or from terminal to terminal, for example, is considered. Distribution fan-outs are defined for each flow and comprise the totality of the possible routes of data packets of a flow. It is advisable where possible to permit a number of different paths for packets of a flow in order to ensure flexibility. It is also possible to employ weightings on a section by section basis in order to weight certain paths or certain connection sections more heavily for traffic distribution, e.g. because a higher transmission capacity is available there. In order to characterize the distribution fan-outs more closely, the term link is used. A fan-out then consists of a plurality of (logical) links. A (logical) link denotes a (physical) connection section via which the associated fan-out of the link can transmit data packets. In contrast to the (physical) connection sections, the (logical) links are assigned a direction which specifies in which direction the distribution fan-out of the link can transmit data packets via the connection section.

According to the invention, network nodes are classified as a function of an egress node for flows. The class is determined from the minimum number of hops or connection sections between the relevant node and the egress node. The minimum number of hops can be determined for IP networks, for example, using topology information exchanged by routing protocols such as SPF or OSPF. Network nodes having the same distance from the egress node in terms of the minimum number of hops belong to the same class. For the sake of simplicity, network nodes of class N will now be referred to, N being a natural number and denoting the minimum number of hops to the egress node. From nodes of class N, links can now be routed to nodes of class N−1, i.e. in the direction of the egress node. In order to have as large a multiplicity of routes as possible, it is advisable to introduce logical links for a node of class N>1 for all connection sections to nodes of class N−1. The logical links thus introduced always lead from nodes of a class having a larger minimum number of hops (class N) to a class with a minimum number of hops that is fewer by 1 (class N−1). The links thus defined consequently contain no loops. It is also possible to introduce logical links within a class, taking care to ensure loop freedom. In addition to loop freedom, account must be taken of the following two aspects when introducing logical links within a class: where possible, all nodes must have many outgoing links in order to have alternatives in the event of disturbances. For this reason the lower limit of the number of outgoing links for a class must be as large as possible. The other aspect is that as many links as possible must be defined within a class in order to optimize the number of route alternatives, taking care to ensure loop freedom within the class.

By introducing classes and defining links from nodes of the higher class to the lower class in each case, a framework for flow-related distribution fan-outs is defined which can be supplemented by links within the individual classes. Major advantages of this are efficiency and loop freedom. The traffic distribution according to the invention is concentrated on links between classes. By using the number of hops as the metric, the routing from higher to lower classes minimizes the route of the data packets. The routing or the distribution within classes can be restricted to a minimum, thereby ensuring paths that are as short as possible and consequently providing efficient routing. The routing from higher classes to lower classes of nodes is unidirectional. Loops containing nodes of more than one class are eliminated in this routing. The problem of establishing loop freedom in the network as a whole is reduced to defining links within classes of nodes while avoiding looping within the class. The original problem is therefore mapped to a problem of a considerably lower degree of complexity.

For loop-free defining of links within a class, the following procedure can be used:

The nodes of the class are sequenced according to the number of outgoing links or in the case of nodes with the same number of outgoing links according to the capacity of the incoming links.

For at least some of the nodes, the following steps are performed according to the sequence for each node:

The shortest path from the relevant node to the set of nodes of the class which is fewer by 1 is identified, paths via the outgoing links leading directly to nodes of class N−1 being disregarded. By identifying the shortest path, traffic distribution within the class is minimized, i.e. efficient routing is ensured. In the case of plurality of paths with minimum distance to the next lower class, all can be examined for loop freedom.

If an identified path does not lead to a loop within the nodes of the class, the link via the first connection section of the identified path is incorporated into distribution fan-outs as a link. In the case of a plurality of identified paths, one can be selected if there is loop freedom or more than one link can be defined for the node in question.

The inventive definition of distribution fan-outs has the advantage of high flexibility and low susceptibility to disturbance. The distribution fan-out defined according to the invention relates only to an egress node. From the distribution fan-out, a traffic distribution can be derived for all flows transmitted via the egress node by selecting links of the distribution fan-out. For example, the ingress node is included in the classification for a flow. The totality of the paths from the ingress node of the flow to the egress node, which are routed via links of the distribution fan-out, defines a subset of links of the distribution fan-out which in turn define a distribution fan-out for the flow in question. The routing tables of the routers of the packet network can now be set up according to the distribution fan-outs for flows. The routing or forwarding of data packets within the packet network then takes place according to the distribution fan-out for the associated flow. A flow can be distributed over a plurality of paths of the associated distribution fan-out in order to ensure a balanced traffic distribution. This distribution can take place e.g. according to connection membership of packets or depending on the destination and source address of the packet. Data transmission with QoS level can be implemented by limiting the entire traffic volume of the network and, by means of traffic distribution according to the invention, avoiding delays by concentrating on routing from higher classes to lower classes and avoiding traffic peaks (and therefore bottlenecks) by traffic distribution and alternative paths.

Traffic distribution can be performed dynamically on the basis of current traffic values, the distribution fan-out being so designed that each individual node has as many alternatives as possible for forwarding data packets of a flow.

For all flows leaving the packet network at the egress node, the proposed classification according to an egress node can be used for reacting to link failures. As a bottleneck arises in the vicinity of the egress node in respect of route multiplicity, it is advisable to perform the classification at least for nodes in the vicinity of the egress node. For application in the event of any link failures affecting the flows in question, it is advisable to classify all the nodes via which traffic associated with the egress node in question is routed or to classify all the nodes of the data network. The method or the classification can be performed for all the egress nodes and therefore for all the possible flows.

In the event of failure of an outgoing link of a node classified according to the invention, the following reactions are possible: if the node has two or more outgoing links, the traffic normally routed via the failed link can be distributed via the other link(s) of the node. If the single outgoing link of a node fails, the direction of the incoming links to the node having their egress point at nodes of the same class can be inverted. In the event of failure of the single outgoing link of a node which has no links from nodes of the same class feeding into it, all the links of other classes feeding into it, i.e. for a link of class N generally the links to nodes of class N+1 can be inverted.

If the downtime exceeds a particular limit value, the class of the node with the failed link can be re-determined.

BRIEF DESCRIPTION OF THE DRAWINGS

The invention will now be explained in greater detail in the context of exemplary embodiments and accompanying drawings in which:

FIG. 6 shows the reaction to a failed link by inversion of an incoming link of the same class FIG. 7 shows the reaction to link failure by inversion of links to nodes of other classes FIG. 8 shows the reaction to link failure by reclassification of the node.

DETAILED DESCRIPTION OF THE INVENTION

For an egress node, a distribution fan-out encompassing all the nodes of the network is constructed in the following way: for all the nodes, the distance to the egress node is measured in the minimum number of hops. The number of hops then determines class membership. For each node of a class N, links leading to a node of class N−1 are then defined on all connection sections between the node and nodes of class N−1. The determination of nodes within a class takes place in the following steps. First the nodes of a class are ordered according to the number of outgoing links from the node and the capacity of the incoming links. For this assignment, links are considered in the sequence of the number of outgoing links, going from nodes with a small number of outgoing links to nodes with more outgoing links. In the case of nodes having the same number of outgoing links, those having a higher incoming link capacity are considered first. If the capacity of the incoming links is not known, alternatively the number of incoming links can also be considered. In the sequence, links within the class are defined for the nodes of a class N. The steps are then:
1. Select a node of class N according to the sequence defined above.
2. Identify the shortest path to the set of nodes of the class which is fewer by 1. This path must not lead via the outgoing links leading directly to nodes of class N−1.
3. If this path does not lead to a loop within the nodes of class N, the link via the first connection section of the identified path is incorporated into the distribution fan-out as the link.
4. The next node of class N is then considered in the sequence defined above.

In this way a maximally large number of links within a class is introduced which fulfills the two conditions of loop freedom and a lower limit that is as small as possible for the minimum number of outgoing links.

Figure 1:
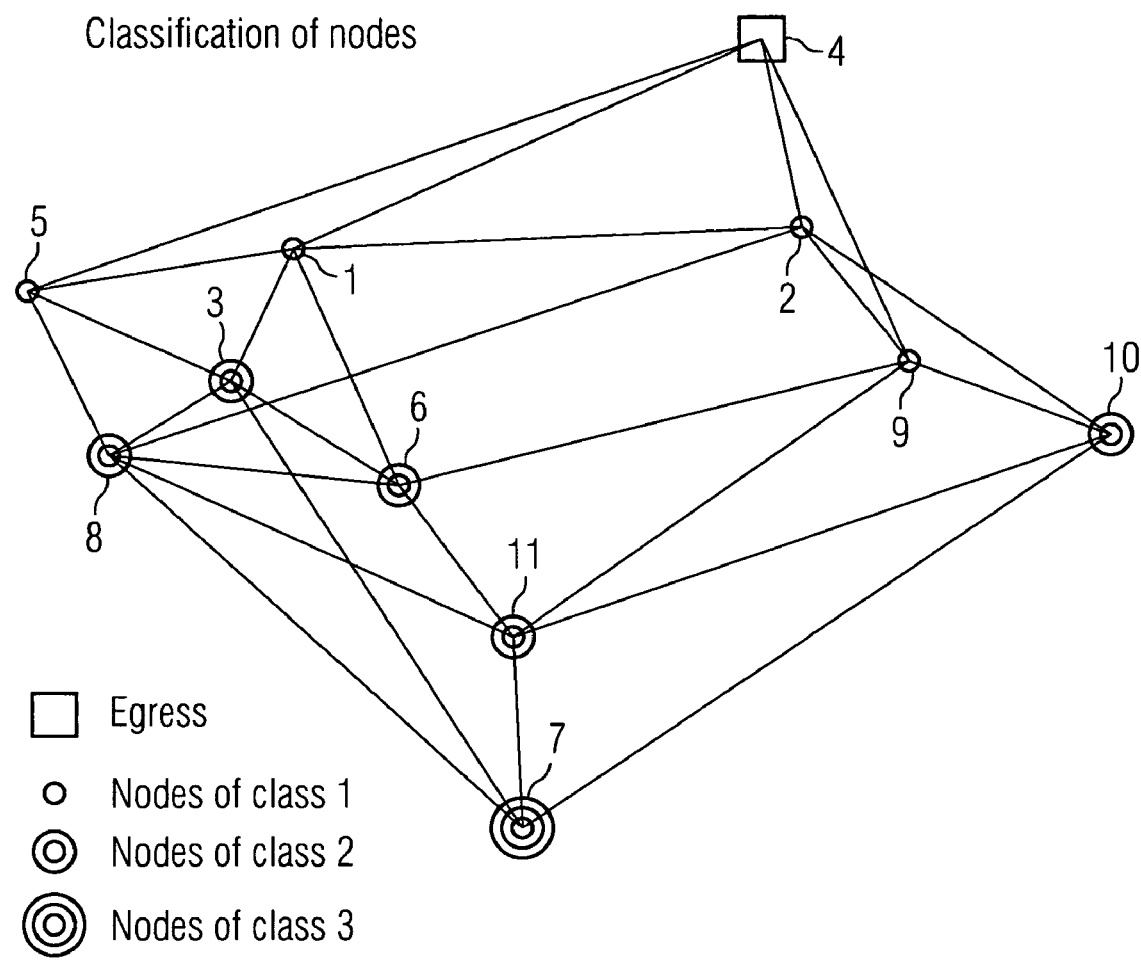
FIG. 1 shows a network section with node classification according to the invention

FIG. 1 shows by way of example 11 network nodes for which a classification according to the invention is performed. The egress node is indicated by a rectangle. Nodes of class 1 are represented by a circle, nodes of class 2 by a double circle and nodes of class 3 by a triple circle. Connection sections between the nodes are denoted by full lines.

Figure 2:
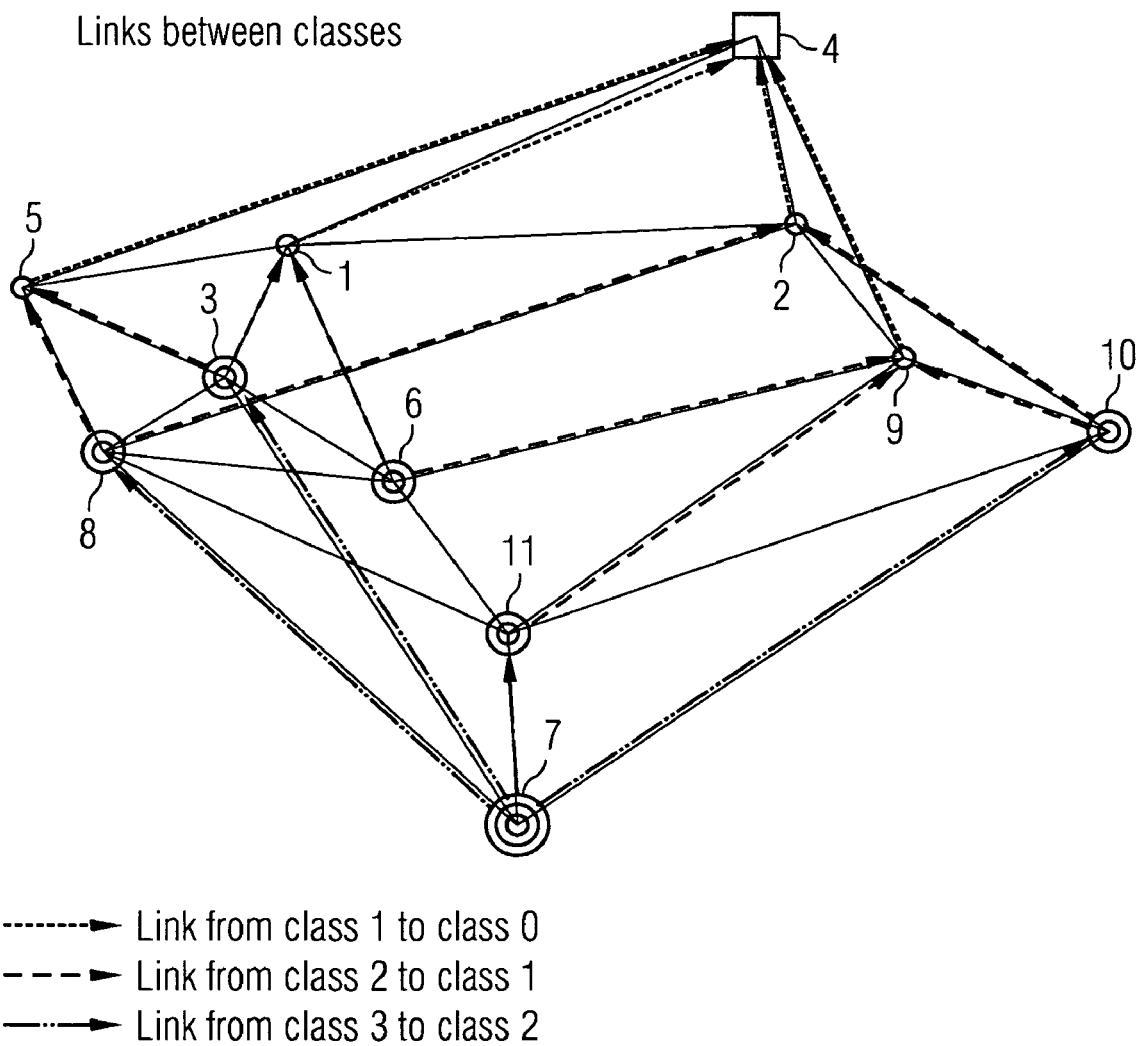
FIG. 2 shows the definition of links between nodes of different classes

FIG. 2 shows the introduction of links between nodes of different classes, the links from class 1 to class 0 are represented by a dotted line and the direction by an arrowhead. The following links between class 1 and 0 exist:
From node 5 to node 4
From node 1 to node 4
From node 2 to node 4
From node 9 to node 4.

Links from class 2 to class 1 are represented by a dashed line and their direction by arrowheads. The following class 2 to class 1 links exist:
From node 8 to node 5
From node 3 to node 5
From node 3 to node 1
From node 6 to node 1
From node 6 to node 9
From node 11 to node 9
From node 10 to node 9

From node 10 to node 2.

Finally, the links from class 3 to class 2 are indicated by a dash-dotted line and by arrowheads. The following links are involved:
From node 7 to node 8
From node 7 to node 3
From node 7 to node 10.

Figure 3:
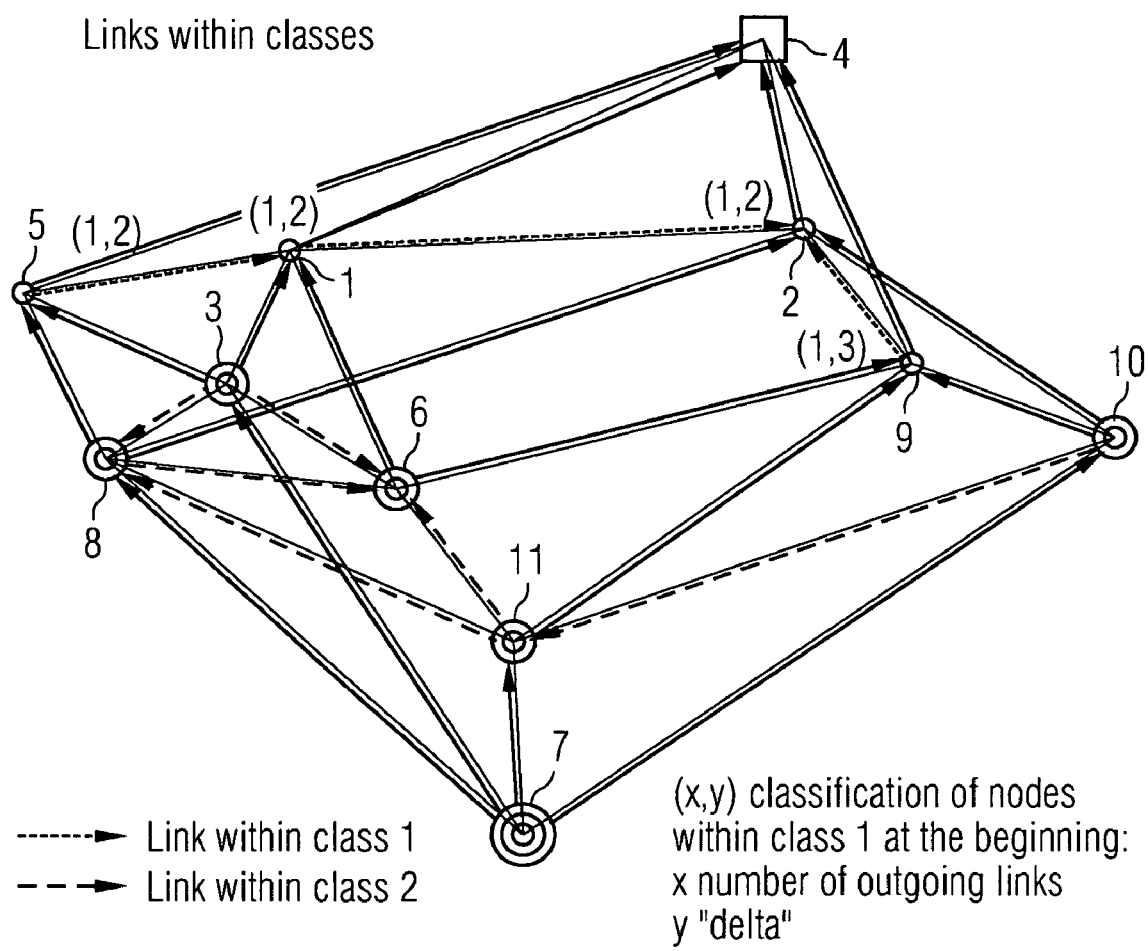
FIG. 3 shows the definition of links between nodes of the same class

FIG. 3 shows how links within classes are defined according to the method described above. Links within class 1 are indicated by dotted arrows and links within class 2 by dashed arrows. The links within class 1 comprise:
From node 5 to node 1
From node 1 to node 2
From node 9 to node 2.

The links within class 2 comprise:
From node 10 to node 11
From node 11 to node 6
From node 11 to node 8
From node 3 to node 6
From node 3 to node 8.

Links between different classes are identified by full-line arrows in FIG. 3.

Figure 4:
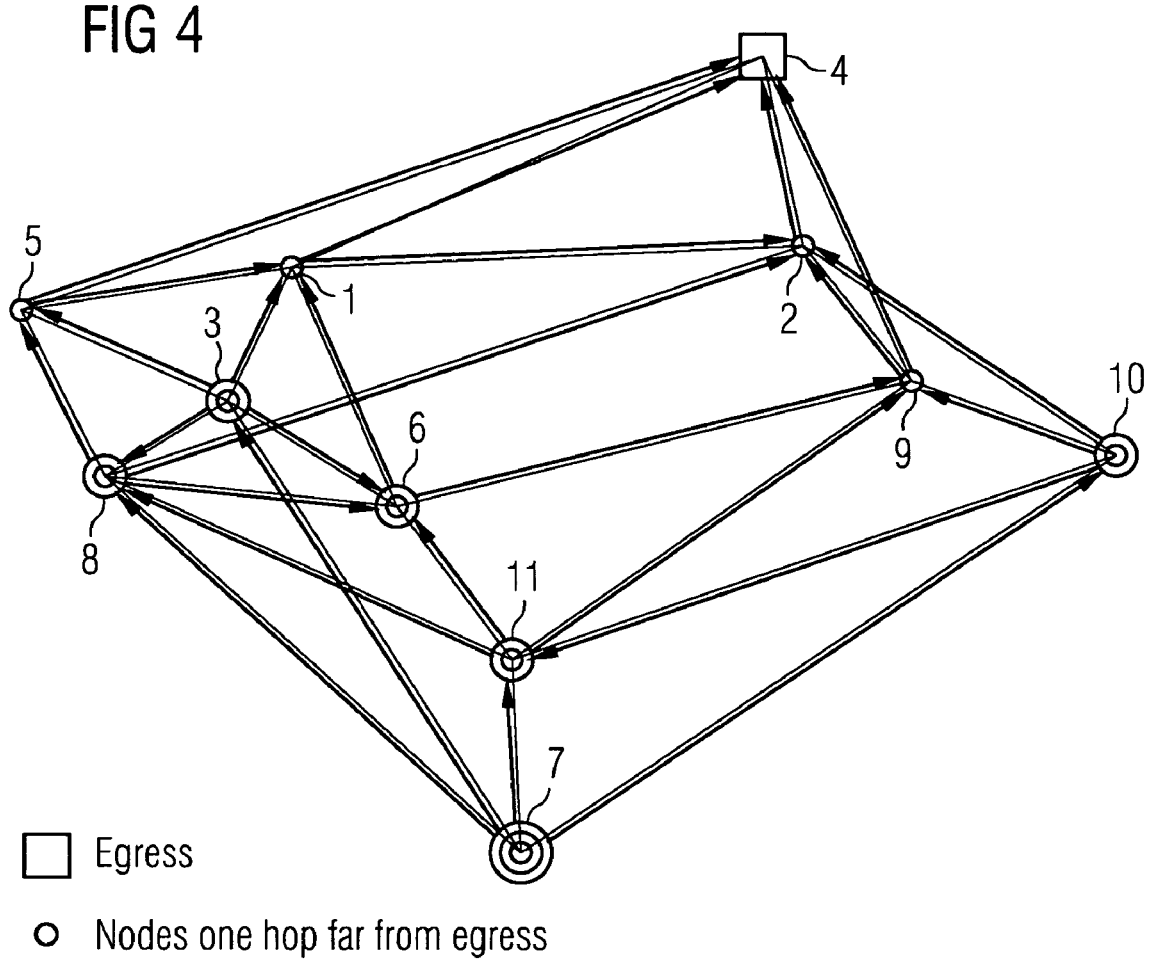
FIG. 4 illustrates the bottleneck in the vicinity of an egress node

In FIG. 4 all the links are indicated by full-line arrows. In the vicinity of the egress node 4, there is a certain bottleneck for topological reasons, as the route fan-out leads to the same point, the egress node, for all routes. For example, it may be easily seen that, for a loop-free route fan-out, a node with only a single outgoing link exists, because if all the nodes of class 1 had a second outgoing link to another node of class 1, a loop would result. In FIG. 4 this is node 2 which has only one outgoing link.

FIGS. 5 to 8 now show link failure reactions provided for according to the invention.

Figure 5:
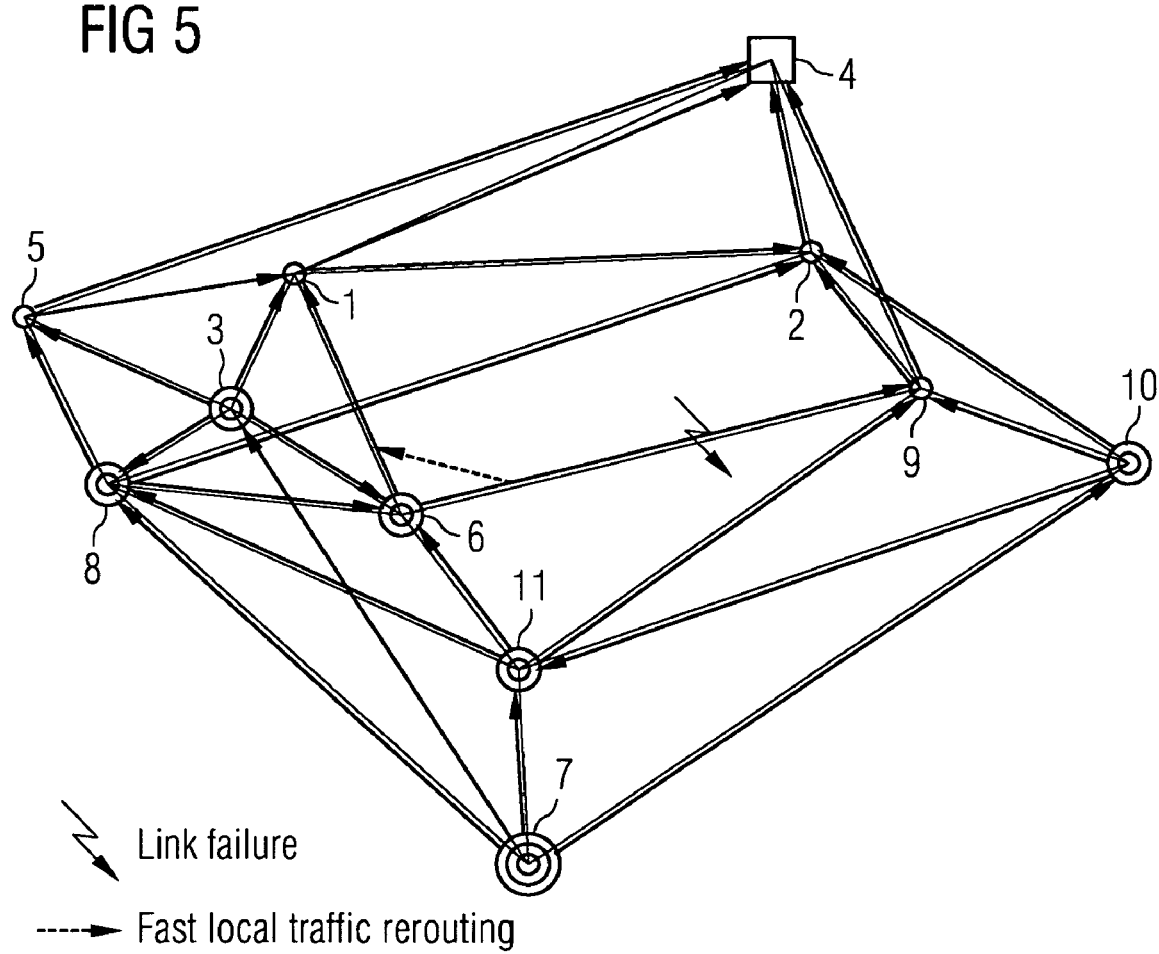
FIG. 5 shows the reaction to link failure by traffic diversion via alternative outgoing links

In FIG. 5, the link between nodes 6 and 9 has failed. As indicated by a dotted arrow, the traffic which would normally have been transmitted between nodes 6 and 9 is now carried via the links from node 6 to node 1.

In FIG. 6 the single outgoing link from node 2 to node 4 is disturbed. As a reaction—indicated by dotted arrows—links to nodes of the same class are inverted and thereby become outgoing links. The direction of the link from node 1 to node 2 and the link from node 9 to node 2 is reversed.

In FIG. 7 the links between node 9 and node 2 and between node 9 and node 4 have failed. Node 9 therefore has no more outgoing links and also possesses no incoming links from nodes of the same class. As a reaction, all the incoming links from nodes of a higher class are inverted. These are the links from node 6 to node 9, from node 11 to node 9 and from node 10 to node 9.

Finally, FIG. 8 shows the same disturbance as in FIG. 7, a new classification of node 9 having taken place because of the duration of the problem. Node 9 is now classified as a node of class 3 instead of class 1. The dotted arrows now describe changed traffic routing compared to the undisturbed case because of the new classification of node 9.

The invention claimed is:
1. A method for defining a distribution fan-out for the distribution of traffic via different paths in a packet-based communication network formed by a plurality of nodes and a plurality of connection sections for packet traffic having the same egress node, the method comprising:
defining for the communication network a node arrangement comprising a plurality of distinct node classes that encompasses all of the plurality of nodes of the communication network, wherein each respective one of the distinct node classes is distinguished from one another based on a number of hops required by each node in a given class to reach the egress node;

wherein the defining of the node arrangement comprises dividing all of the plurality of nodes into the plurality of distinct classes subject to satisfying a first condition and a second condition, wherein the first condition establishes for each node a path to the egress node which is measured in a minimum number of hops, and the second condition establishes no loop formation within each distinct class, the node classes are determined according to the minimum number of hops between the nodes and the egress node, whereby nodes with the same minimum number of hops belong to the same class; and routing from each node of a class at least one link to a node of a class having one fewer hop, wherein from each node of a class, a link is routed to a node of a class having wherein for at least one node of a class which is connected by a connection section to a node of the same class, at least one link between the node and a node of the same class is defined, wherein, in the case of a node which is assigned to a class and which has one outgoing link, in the event of failure of said outgoing link:

for each logical link to the respective node that originates from a node having the same class as the respective node, the respective logical link is inverted, and when no link to the respective node originates from a node having the same class, all logical links to the respective node are inverted to nodes of a class having one more hop.

2. The method according to claim 1, further comprising:
defining links on connection sections between nodes of a class, wherein said links being defined according to a maximum of the least number of outgoing logical links for the node and according to loop freedom in respect of the links between nodes of the class.

3. The method according to claim 2, wherein
for nodes of the class, the nodes are sequenced according to the number of outgoing links and, when nodes have the same number of outgoing links, according to the capacity of the incoming links, and performing for at least some of the nodes, the following steps for each node depending on their sequence:

identifying the shortest path from the node to the set of nodes of the class which is fewer by one, paths via outgoing links leading directly to nodes of the class N−1 being disregarded, and incorporating the link via the first connection section of the identified path into the distribution fan-out as a link, when an identified path does not lead to a loop within the nodes of the class.

4. The method according to claim 2, wherein for nodes of the class, the nodes are sequenced according to the number of outgoing links and, when nodes have the same number of outgoing links, according to the capacity of the incoming links, and performing for at least some of the nodes, the following steps for each node depending on their sequence:

identifying the shortest path from the node to the set of nodes of the class which is fewer by one, paths via outgoing links leading directly to nodes of the class N−1 being disregarded, and incorporating the link via the first connection section of the identified path into the distribution fan-out as a link, when an identified path does not lead to a loop within the nodes of the class.

5. The method according to claim 1, wherein, in the case of a node which is assigned to a class and which has at least two outgoing links, in the event of failure of one of the outgoing links, the traffic to be routed via this link is distributed onto the other outgoing link or links.

6. The method according to claim 2, wherein, in the case of a node which is assigned to a class and which has at least two outgoing links, in the event of failure of one of the outgoing links, the traffic to be routed via this link is distributed onto the other outgoing link or links.

7. The method according to claim 3, wherein, in the case of a node which is assigned to a class and which has at least two outgoing links, in the event of failure of one of the outgoing links, the traffic to be routed via this link is distributed onto the other outgoing link or links.

8. The method according to claim 1, wherein in the event of failure of an outgoing link of a node assigned to a class, the class of the node is redefined when the duration of the failure exceeds a limit value.

* * * * *